(12) United States Patent
Hiramine

(10) Patent No.: US 10,210,687 B2
(45) Date of Patent: Feb. 19, 2019

(54) PORTABLE COMMUNICATION DEVICE AND COMMUNICATION SYSTEM

(71) Applicant: Mitsubishi Electric Corporation, Tokyo (JP)

(72) Inventor: Masanobu Hiramine, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/784,848

(22) Filed: Oct. 16, 2017

(65) Prior Publication Data

US 2018/0330560 A1 Nov. 15, 2018

(30) Foreign Application Priority Data

May 12, 2017 (JP) ................................. 2017-095598

(51) Int. Cl.
 *B60R 25/24* (2013.01)
 *G07C 9/00* (2006.01)
(52) U.S. Cl.
 CPC .......... *G07C 9/00309* (2013.01); *B60R 25/24* (2013.01); *B60R 2325/205* (2013.01); *G07C 2009/00587* (2013.01)
(58) Field of Classification Search
 CPC ........ G07C 9/00309; G07C 2009/0038; G07C 2209/63
 USPC ......... 340/426.17, 426.36, 5.61; 701/51, 101
 See application file for complete search history.

(56) References Cited

U.S. PATENT DOCUMENTS

| 2009/0224876 A1* | 9/2009 | McCall .............. G07C 9/00309 340/5.61 |
| 2014/0232322 A1* | 8/2014 | Kracker .................. B60R 16/00 320/103 |
| 2014/0368313 A1* | 12/2014 | Seiberts ............. G07C 9/00309 340/5.61 |

(Continued)

FOREIGN PATENT DOCUMENTS

| JP | 10-65599 A | 3/1998 |
| JP | 2010-168009 A | 8/2010 |

(Continued)

OTHER PUBLICATIONS

Communication dated Jun. 26, 2018 issued by the Japanese Patent Office in counterpart application No. 2017-095598.

*Primary Examiner* — Omeed Alizada
(74) *Attorney, Agent, or Firm* — Sughrue Mion, PLLC; Richard C. Turner

(57) ABSTRACT

In a two-way communication system made up of a portable communication device and a fixed communication device, the portable communication device includes a stasis/movement determining circuit configured to convert a change in position of the portable communication device into an electric signal, and to determine from the electric signal whether the portable communication device is in a moving state or a stationary state in which the portable communication device does not move for a set length of time. The communication system performs control in which a two-way communication circuit is suspended when the stationary state is detected and the portable communication device is outside the range of communication to and from the fixed communication device, and is activated when the moving state of the portable communication device is detected while the two-way communication circuit is suspended.

16 Claims, 12 Drawing Sheets

(56) References Cited

U.S. PATENT DOCUMENTS

2016/0236652 A1 8/2016 Miyazawa
2017/0358159 A1* 12/2017 Hanson .............. G07C 9/00309

FOREIGN PATENT DOCUMENTS

| JP | 2013-233341 A | 11/2013 |
| JP | 2016-056598 A | 4/2016 |
| WO | 2015/068727 A1 | 5/2015 |
| WO | 2015/068727 A1 | 3/2017 |

* cited by examiner

PORTABLE COMMUNICATION DEVICE AND COMMUNICATION SYSTEM

BACKGROUND OF THE INVENTION

1. Field of the Invention

The present invention relates to a communication system including a fixed communication device and a portable communication device, for example, a keyless system for automobiles that is made up of an in-vehicle communication device and a portable communication device carried by a user.

2. Description of the Related Art

There is a communication system that wirelessly controls and monitors a remote target through data communication between a fixed communication device set up in the vicinity of the target and a portable communication device carried by a user. Communication systems of this type are, for example, remote engine start systems for vehicles and keyless entry systems, and have become increasingly popular in recent years. A remote engine start system is configured to remotely control the start, stop, and other actions of a vehicle's engine by operating a button or the like on a portable device. A keyless entry system is configured to transmit challenge data in a low frequency (LF) band from an in-vehicle communication device to a portable communication device when a switch or a touch sensor that is provided on a door handle or in a similar place is operated, other than when a button on the portable communication device is operated, and send a response signal in an ultra-high frequency (UHF) band from the portable communication device to the in-vehicle communication device in response to the challenge data. The keyless entry system executes the unlocking/locking of the door or other types of operation to control in-vehicle equipment in the case where this series of steps of authentication communication is established.

In vehicle communication systems of the type described above, one-way communication in the UHF band has commonly been used for remote communication from the portable communication device to the fixed communication device, but is being replaced with two-way communication due to a demand for higher sophistication of the functions of communication systems. Two-way communication enables the communication systems to deal with the diversity of pieces of equipment that are targets of vehicle control, and to provide data about vehicle condition to the user from the vehicle in a timely fashion.

One of methods of accomplishing two-way communication is to turn UHF communication that has been one way into two-way UHF communication. Another method of accomplishing two-way communication is to add a communication circuit compliant with a wireless standard of Bluetooth (trademark) Low Energy, or to replace a UHF communication circuit with a communication circuit that follows the wireless standard of Bluetooth Low Energy, and communication systems that employ this method are increasing in number.

The portable communication device needs to keep executing reception check operation all the time in a communication system that turns one-way UHF communication into two-way UHF communication. The portable communication device in a communication system that uses a Bluetooth Low Energy communication circuit to accomplish two-way communication also needs to execute communication operation intermittently even when the portable communication device is not connected for communication, in order to establish communication connection to the fixed communication device. Whichever method is used, accomplishment of two-way communication increases power consumption. Portable communication devices in general use a small-sized battery and accordingly have a problem in that increased power consumption shortens battery life. It is therefore indispensable to reduce the overall power consumption of a portable communication device. Methods of reducing unnecessary power consumption of a portable communication device in a stand-by mode have been proposed as a solution.

A keyless entry system disclosed in WO 2015/068727 A1 has a communication device configuration in which two-way communication means using Bluetooth Low Energy or other technologies is added to an existing keyless entry system. This system regards a state in which a portable communication device is not connected for two-way communication, or a state in which the signal strength is at a certain level or lower, as an unused state of a portable communication device, and suspends LF reception processing and all communication functions of the portable communication device other than that of a two-way communication unit when the portable communication device is in the unused state, to thereby suppress the increase in power consumption of the portable communication device.

Similarly to the keyless entry system disclosed in WO 2015/068727 A1, a portable device and a vehicle communication system disclosed in Japanese Patent Application Laid-open No. 2016-56598 have a communication device configuration in which two-way communication means using Bluetooth Low Energy or other technologies is added to an existing keyless entry system. In this system, a condition for putting communication units other than a two-way communication unit into operation is that the portable device is connected for two-way communication, or that operation performed on the portable device is detected, and a condition for suspending the communication units is that communication is cut off, or that a certain length of time has elapsed since the cutting off of communication. The same effect of suppressing the increase in power consumption as that in WO 2015/068727 A1 is expected.

The communication systems of WO 2015/068727 A1 and Japanese Patent Application Laid-open No. 2016-56598 both aim to keep power consumption low by constantly monitoring the connection state of the added two-way communication circuit and a communication state that is measured by signal strength or other indicators, and controlling other types of processing than two-way communication in a manner suited to the communication state. The premise of this approach is that the two-way communication circuit is much smaller in power consumption than other communication circuit units. The Bluetooth Low Energy communication method is attracting attention as a two-way communication method that requires very small power consumption in recent years, and is positioned as the main method of two-way communication in WO 2015/068727 A1 and Japanese Patent Application Laid-open No. 2016-56598 as well.

In Bluetooth Low Energy communication, however, a communication device that is to make connection for communication needs to transmit specific data periodically to the surroundings even while the communication device is not connected. It is therefore common in communication systems that employ the Bluetooth Low Energy communication method to execute communication processing in which a signal is transmitted periodically from the portable communication device to the fixed communication device. Power consumption can be reduced by setting a long interval for this communication. However, setting a long communication interval increases a delay in establishing communication since a request for communication is made, and results in poor response. This affects marketability, which means that there is a certain limit to how long an interval can be set for the communication. In the case where the communication interval is set to 1 second or so in consideration for responsiveness, power consumed by a two-way communication circuit of Bluetooth Low Energy is several times larger than power consumed by an LF band reception circuit and, even with an LF reception circuit unit suspended, the battery life of a portable communication device to which a two-way communication circuit of Bluetooth Low Energy is added is a fraction of the battery life in a portable communication device that does not use the two-way communication circuit. The resultant drop in marketability is a big issue.

Other than the patent documents cited above, there is a communication system in which UHF communication that has been one-way communication from a portable communication device to a fixed communication device is turned into two-way UHF communication for higher sophistication in function. This system, however, requires the portable communication device to remain open to reception in order to implement the two-way communication function, which cuts battery life short and requires frequent battery replacement. The system consequently has a problem of low convenience.

SUMMARY OF THE INVENTION

The present invention has been made in view of the circumstances described above, and has an object to provide a portable communication device that suppresses an increase in power consumption while avoiding impairing convenience in a sophisticated communication system with a two-way communication circuit installed therein, and the communication system.

According to one embodiment of the present invention, there are provided a portable communication device and the like, including: a portable communication device-side two-way communication circuit configured to communicate data to and from a fixed communication device through two-way wireless communication; a stasis/movement determining circuit configured to convert a change in position of the portable communication device into an electric signal, and to determine from the electric signal whether the portable communication device is in a moving state or a stationary state in which the portable communication device does not change a position for a set length of time; and a portable communication device-side communication control device configured to suspend the portable communication device-side two-way communication circuit when it is determined that the portable communication device is in the stationary state and communication to and from the fixed communication device is currently inexecutable, and to activate the portable communication device-side two-way communication circuit when a shift of the portable communication device to the moving state is detected while the portable communication device-side two-way communication circuit is suspended.

According to the present invention, the portable communication device that suppresses an increase in power consumption while avoiding impairing convenience in a sophisticated communication system with a two-way communication circuit installed therein, and the communication system may be provided.

DESCRIPTION OF THE EMBODIMENTS

Figure 1:
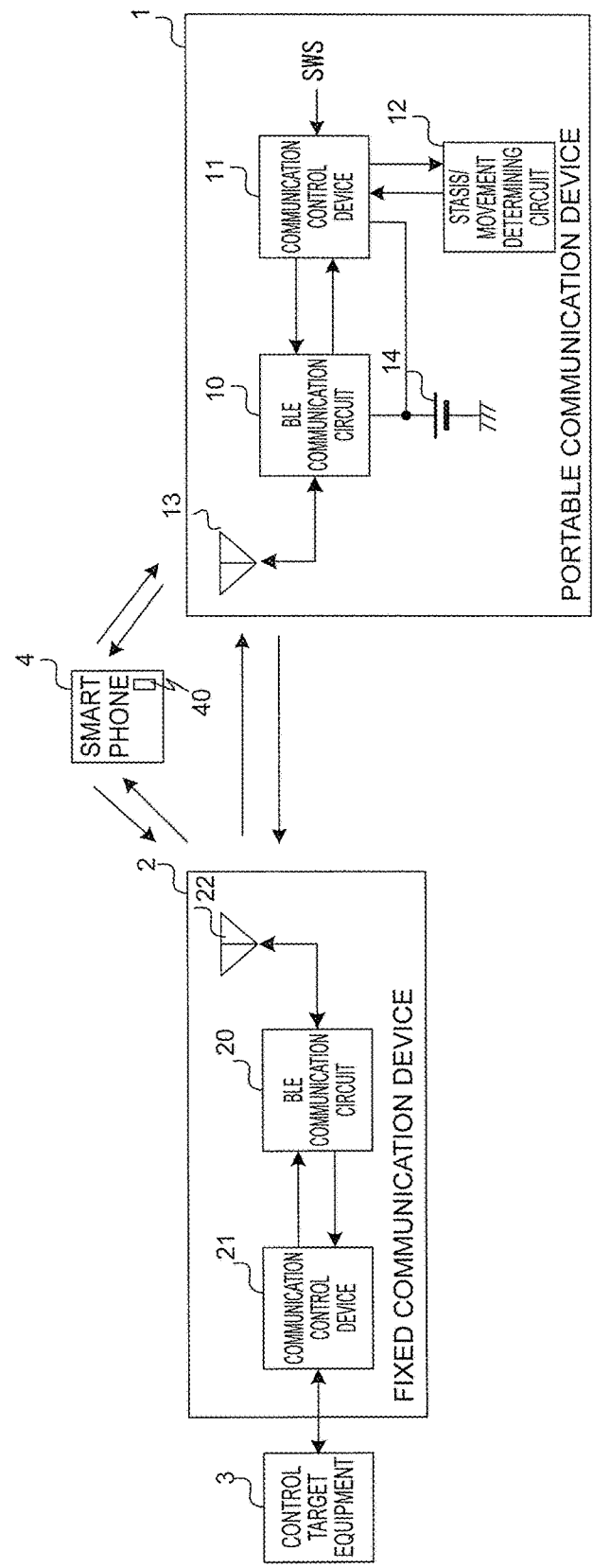
FIG. 1 is a block diagram for illustrating a communication system including a portable communication device and a fixed communication device according to a first embodiment of the present invention.

In a portable communication device and communication system of the related art that include a two-way communication circuit of Bluetooth Low Energy or other technologies for higher sophistication in function, a state in which a two-way communication channel is not connected or a state in which the strength of received signal is lower than a certain value is determined as an unused state of the portable communication device, and power consumption is cut by suspending communication circuit portions other than the two-way communication circuit when the portable communication device is in the unused state. Power consumed by the two-way communication circuit, however, is at an unignorable level compared to the power consumption of other portions, and cutting the power consumption of the two-way communication circuit is indispensable in accomplishing the sophistication of the functions of the portable communication device.

In contrast, the present invention reduces the power consumption of the two-way communication circuit itself by controlling the activation and suspension of the two-way communication circuit, based on the output of a stasis/movement determining circuit that is low in power consumption, and on the result of determining whether or not the portable communication device is within a two-way communication range. There are many situations in which the portable communication device is outside the range of two-way communication and is left unattended or stored while not in use and shut down, for example, when a user is at home or is working at the office, and the present invention has a great effect of suppressing power consumption.

A stasis/movement determining circuit that is low in power consumption can be created by various methods, including the utilization of a mechanical switch that is switched on and off by vibration. The stasis/movement determining circuit described in the present invention includes an acceleration detecting circuit and a long-running timer, has a simple configuration and high precision, and consumes significantly less power than the two-way communication circuit. The overall power consumption is therefore still low despite the addition of the stasis/movement determining circuit.

When the portable communication device is connected for two-way communication, in other words, when the portable communication device is within the communication range, processing of the stasis/movement determining circuit is suspended due to the need to maintain this communication connection, and the stasis/movement determining circuit is activated only when the portable communication device is not connected for two-way communication. This prevents the stasis/movement determining circuit from operating unnecessarily, and reduces power consumed by the stasis/movement determining circuit itself as well.

In the case where the portable communication device is implemented by a smartphone as in the present invention, an increase in power consumption required for two-way communication between the smartphone and a fixed communication device is suppressed, and the need for a dedicated portable communication device is eliminated, which reduces the cost of introducing the communication system.

Now, a portable communication device and communication system according to each of embodiments of the present invention are described with reference to the drawings. In each of the embodiments, the same or corresponding portions are denoted by the same reference symbols, and the overlapping description thereof is omitted.

FIG. 1 to FIG. 4 are configuration diagrams for illustrating an overview of a communication system according to a first embodiment to a fourth embodiment of the present invention, respectively. The communication system includes a portable communication device and a fixed communication device. The following description takes as an example a case where the communication system is configured as a keyless system for a vehicle. In this case, the fixed communication device is an in-vehicle communication device and the portable communication device is a wireless vehicle key carried by a user.

In the following description, Bluetooth Low Energy is a name for Version 4.0 of the specifications of Bluetooth, which is a wireless PAN technology and one of short-distance wireless communication standards for digital equipment, and may be hereinafter abbreviated as BLE.

First Embodiment

In the first embodiment illustrated in FIG. 1, a portable communication device 1 is a communication device carried by a user, and includes a BLE communication circuit 10 configured to hold two-way communication by BLE, a portable communication device BLE antenna 13 used to transmit and receive a BLE wireless signal, a stasis/movement determining circuit 12 configured to detect stasis/movement of the portable communication device 1, a portable communication device-side communication control device 11 configured to control the BLE communication circuit 10 based on the stationary/in-motion state, and a battery 14 configured to supply power.

A fixed communication device 2 is a communication device fixed to a vehicle or the like, and includes a BLE communication circuit 20 configured to hold two-way communication, a fixed communication device BLE antenna 22 used to transmit and receive a BLE wireless signal, and a fixed communication device-side communication control device 21 configured to control the BLE communication circuit 20.

Control target equipment 3 is target equipment controlled based on data that is received by the fixed communication device 2, and corresponds to a door, an engine, or other pieces of in-vehicle equipment in the case of a vehicle.

A smartphone 4 is a portable terminal that includes a portable terminal-side communication circuit 40 configured to connect to and hold communication to/from one or both of the portable communication device 1 and the fixed communication device 2. The smartphone 4 also includes a communication control device and other components that are included in the portable communication device 1 and the fixed communication device 2. However, illustration and description of the rest of the smartphone components are omitted here.

The fixed communication device 2 controls the control target equipment 3, which is in-vehicle equipment, for example, and the portable communication device 1 exchanges control data about the control of the control target equipment 3 with the fixed communication device 2 through wireless communication.

In BLE communication, one of a pair of communication devices that carry out communication with each other, transmits a signal at regular intervals so as to be found by and connected to the other of the pair of communication devices. The other communication device finds the signal from the paired communication device through scan operation of a reception circuit and, once the signal is found, executes communication connection processing. After connection is made, processing of maintaining synchronous communication is executed by carrying out communication with each other, at predetermined regular intervals. The executed processing involves establishing connection for communication when the portable communication device 1 enters a BLE communication range, and cutting off communication when the portable communication device 1 moves out of the BLE communication range.

In the case where the portable communication device 1 enters a stationary state (SCO) and is also in a communication inexecutable state (CIP) in which BLE communication is cut off at the time, the portable communication device 1 is obviously staying outside the communication range, and the BLE signal processing accordingly does not need to be executed. When the portable communication device 1 shifts to a moving state (MCO), the BLE signal processing needs to be resumed immediately because there is a chance that the portable communication device 1 may enter the BLE communication range.

The stasis/movement determining circuit 12 determines whether the portable communication device 1 is in a stationary state (SCO) or a moving state (MCO), which enables the communication control device 11 to control the BLE communication circuit 10 based on the result of this determination and on the BLE connection state. The power consumption of the portable communication device 1 can accordingly be reduced. The communication control device 11 suspends the stasis/movement determining circuit 12 when BLE communication is in a communication executable state (CPO) and connection for communication is made (CCO), which prevents unnecessary execution of stasis/movement determination and suppresses an increase in power consumption.

The communication control device 11 includes, for example, a CPU, and is switched on and off by a switch signal SWS, which is issued from a switch provided on the portable communication device 1 (the same applies to the other communication control devices).

Second Embodiment

Figure 2:
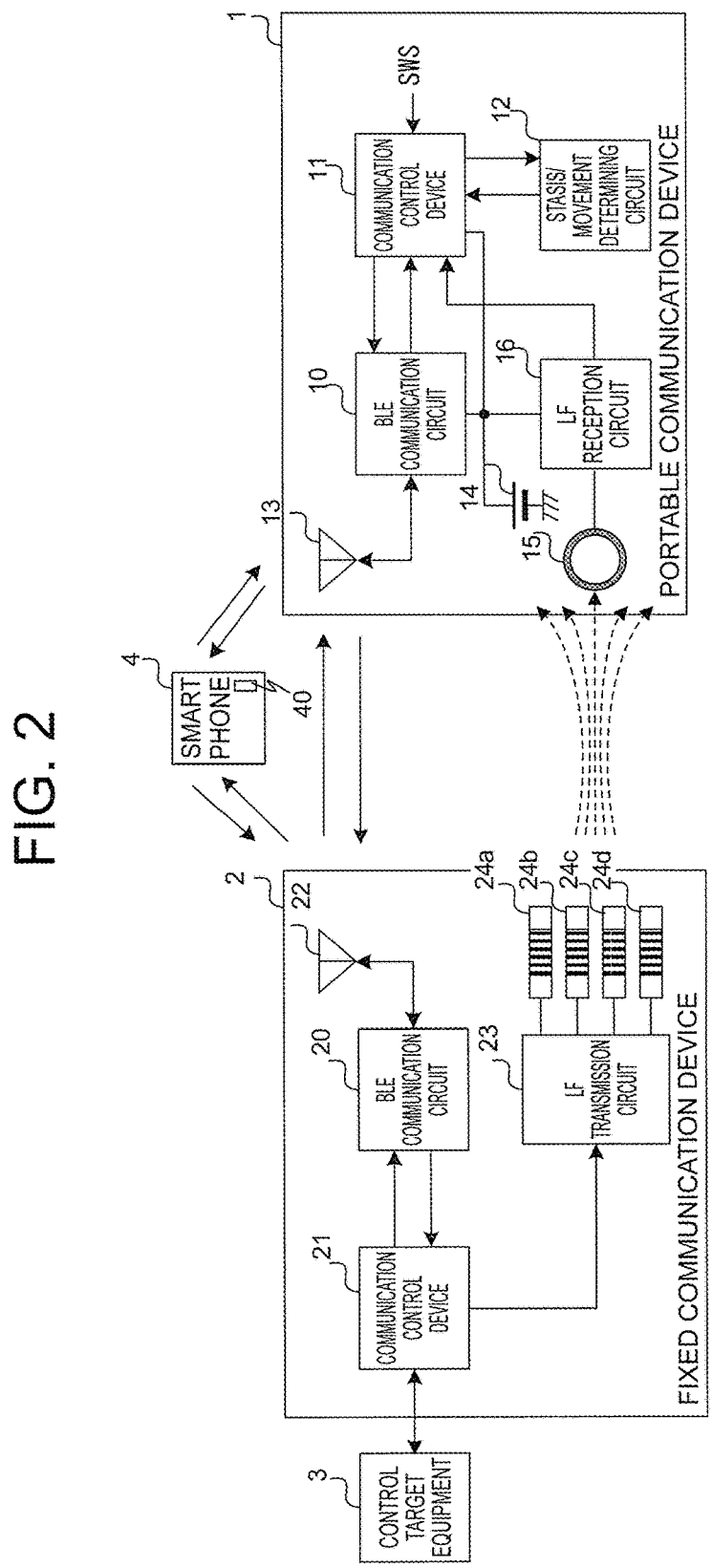
FIG. 2 is a block diagram for illustrating a communication system including a portable communication device and a fixed communication device according to a second embodiment of the present invention.

A second embodiment of the present invention which is illustrated in FIG. 2 has the first embodiment of FIG. 1 as a base, and further includes, in the portable communication device 1, an LF reception antenna 15 and an LF reception circuit 16. The LF reception antenna 15 is used to receive an LF signal that is transmitted from the fixed communication device 2 and that has a short communication range. The LF reception circuit is configured to process the LF signal.

The fixed communication device 2 further includes an LF transmission circuit 23 configured to process data to be transmitted to the portable communication device 1, and a plurality of LF transmission antennas 24a to 24d used to transmit an LF signal that carries this data. An LF signal has a small communication area, and is used to generate a vehicle interior area as well as a vehicle exterior area within a few meters from the vehicle that can be covered by the LF signal. The number of LF transmission antennas, which is four here, is not limited thereto and may be increased or decreased to suit the vehicle size or the layout of the antennas.

As in the first embodiment illustrated in FIG. 1, the communication control device 11 is capable of controlling the BLE communication circuit 10 based on the stationary/in-motion state of the portable communication device 1 determined by the stasis/movement determining circuit 12, namely, whether the portable communication device 1 is in a stationary state (SCO) or a moving state (MCO), and on the BLE connection state, namely, whether BLE communication is in a communication executable state (CPO) or a communication inexecutable state (CIP). The power consumption of the portable communication device 1 can accordingly be reduced. An increase in power consumption is also suppressed because unnecessary execution of stasis/movement determination is prevented by suspending the processing of the stasis/movement determining circuit 12 when the portable communication device 1 is connected for BLE communication, in other words, when BLE communication is in a communication executable state (CPO).

The LF reception circuit 16 notifies the communication control device 11 that an LF band signal transmitted by the fixed communication device 2 has been received. The communication control device 11 receives the notification of LF band signal reception, determines that BLE communication is in a communication executable state (CPO), and activates the BLE communication circuit 10. When BLE communication is temporarily cut off due to interfering noise or the like in the interior of the vehicle, and detection of stasis/movement leads to the suspension of the BLE communication circuit 10, the portable communication device 1 cannot be accessed from outside the vehicle and is locked inside the vehicle. Locking of the portable communication device 1 inside the vehicle can be prevented by configuring an LF signal area that covers the vehicle interior area, which is easy to accomplish, transmitting an LF signal from the fixed communication device 2, and re-activating the BLE communication circuit 10 of the portable communication device 1.

Third Embodiment

Figure 3:
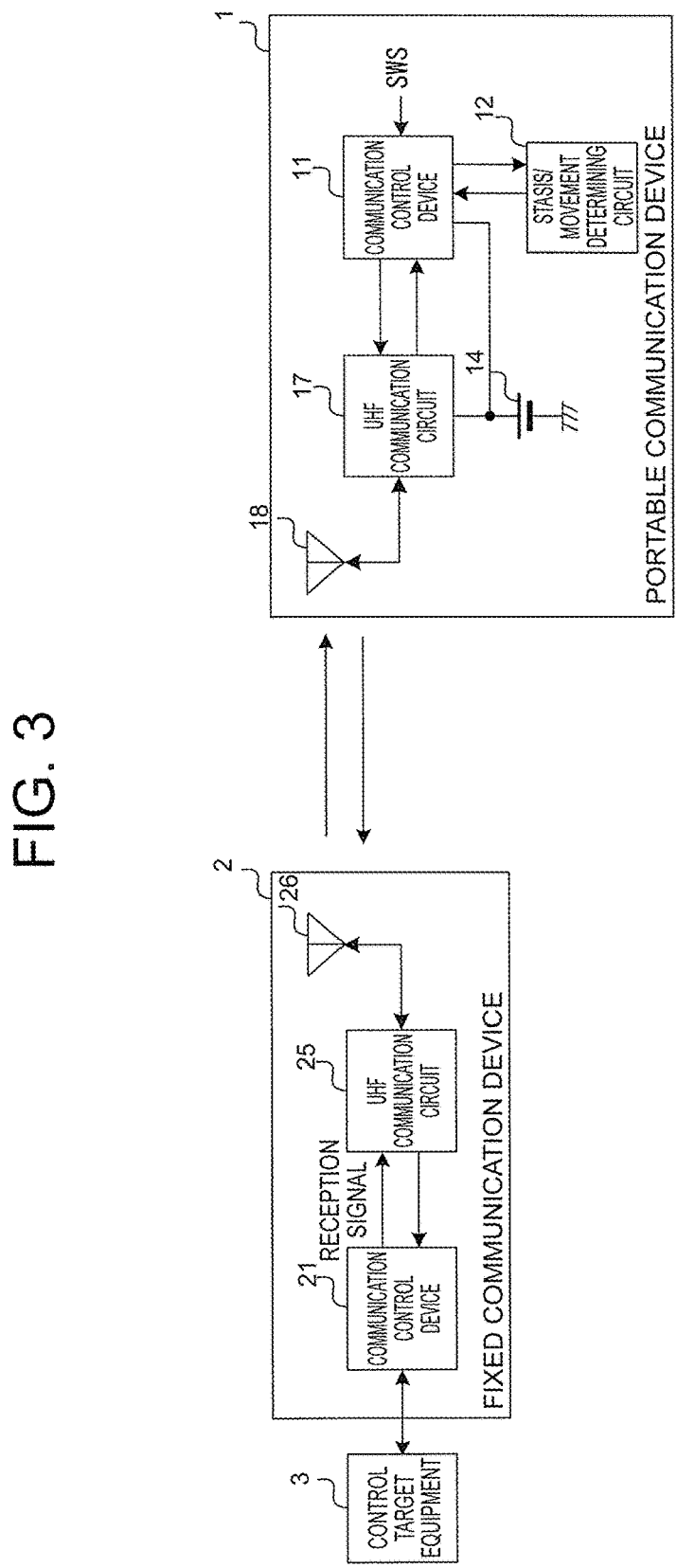
FIG. 3 is a block diagram for illustrating a communication system including a portable communication device and a fixed communication device according to a third embodiment of the present invention.

In a third embodiment of the present invention which is illustrated in FIG. 3, a portable communication device 1 is a communication device carried by a user, and includes a two-way UHF communication circuit 17 using a wireless signal in a UHF band, a portable communication device UHF antenna 18 used to transmit and receive a UHF wireless signal, a stasis/movement determining circuit 12 configured to detect stasis/movement of the portable communication device 1, a portable communication device-side communication control device 11 configured to control the two-way UHF communication circuit 17 based on the stationary/in-motion state, and a battery 14 configured to supply power.

A fixed communication device 2 is a communication device fixed to a vehicle or the like, and includes a two-way UHF communication circuit 25, a fixed communication device UHF antenna 26 used to transmit and receive a UHF wireless signal, and a fixed communication device-side communication control device 21 configured to control the two-way UHF communication circuit 25.

Control target equipment 3 is target equipment controlled based on data that is received by the fixed communication device 2, and corresponds to a door, an engine, or other pieces of in-vehicle equipment in the case of a vehicle.

To hold UHF band communication, the sender-side two-way UHF communication circuit (25 or 17) needs to transmit a UHF band signal while the receiver-side two-way UHF communication circuit (17 or 25) is executing reception processing. UHF reception processing is large in power consumption, which is why short-term reception operation is normally executed at predetermined regular intervals to check whether or not there is a reception signal, instead of remaining open to reception all the time. The sender-side communication device (1 or 2) transmits a signal that lasts for the length of the regular interval or longer to ensure the reception of the signal. This means that the two-way UHF communication circuit 17 needs to continue intermittent reception processing in order for the portable communication device 1 to receive a UHF signal that is transmitted from the fixed communication device 2 at an arbitrary timing.

Whether or not the portable communication device 1 is within the range of communication to and from the fixed communication device 2 can be determined by transmitting a check signal in a UHF band from the portable communication device 1 to the fixed communication device 2, and by determining whether or not the portable communication device 1 receives a UHF response signal that is sent from the fixed communication device 2 in response to the check signal. Whether the portable communication device 1 is inside or outside the communication range is determined by the presence or absence of this response signal in the present invention. When the portable communication device 1 enters a stationary state (SCO) and is outside the UHF communication range at the time, the portable communication device 1 obviously does not need to execute the UHF reception processing. When the portable communication device 1 shifts to a moving state (MCO), the UHF reception processing needs to be resumed immediately because there is a chance that the portable communication device 1 may enter the UHF communication range. The stasis/movement determining circuit 12 can be used to control the two-way UHF communication circuit 17 based on the stationary state (SCO) of the portable communication device 1 and on determination about whether the portable communication device 1 is inside or outside the UHF communication range, namely, whether UHF communication is in a communication executable state (CPO) or a communication inexecutable state (CIP). The power consumption of the portable communication device 1 can accordingly be reduced.

Fourth Embodiment

Figure 4:
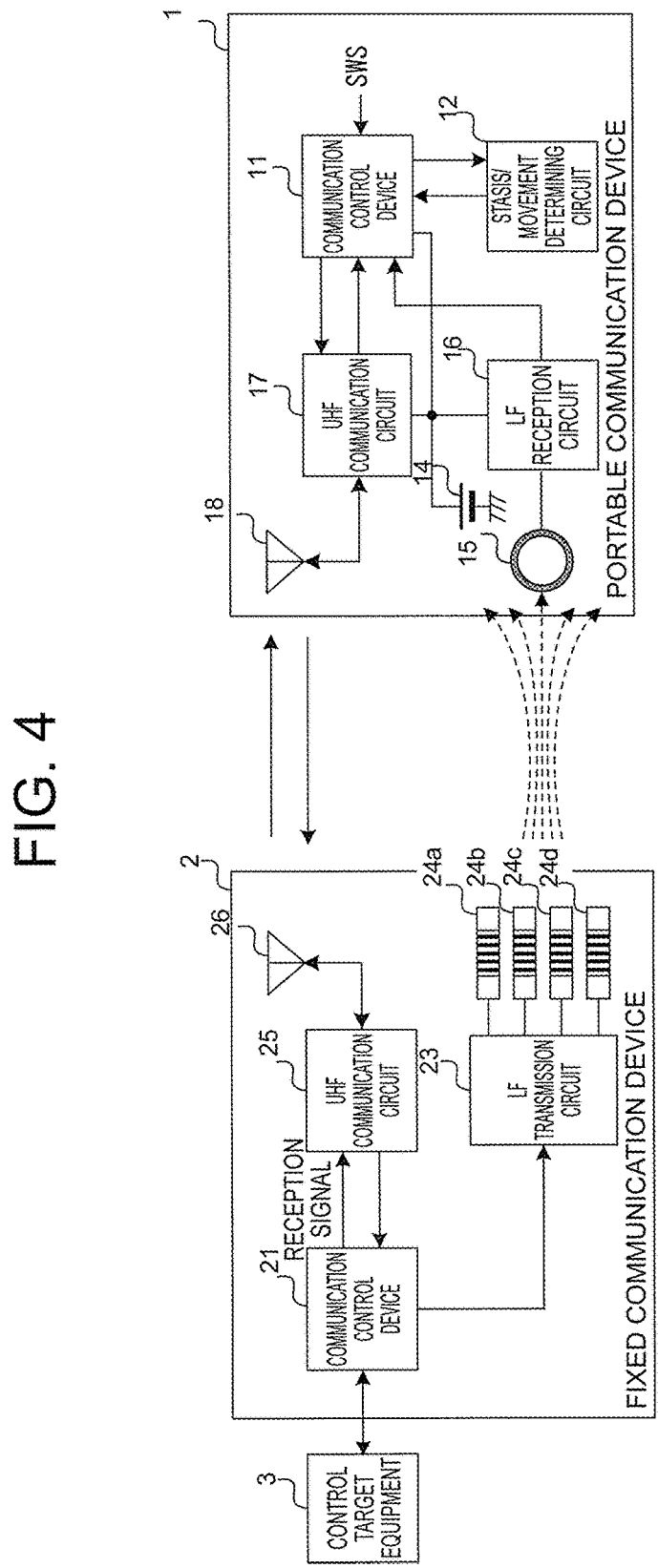
FIG. 4 is a block diagram for illustrating a communication system including a portable communication device and a fixed communication device according to a fourth embodiment of the present invention.

A fourth embodiment of the present invention which is illustrated in FIG. 4 has the third embodiment of FIG. 3 as a base, and further includes, in the portable communication device 1, an LF reception antenna 15 and an LF reception circuit 16. The LF reception antenna 15 is used to receive an LF signal that is transmitted from the fixed communication device 2 and that has a short communication range. The LF reception circuit 16 is configured to process the LF signal.

The fixed communication device 2 further includes an LF transmission circuit 23 configured to process data to be transmitted to the portable communication device 1, and a plurality of LF transmission antennas 24a to 24d used to transmit an LF signal that carries this data. An LF signal has a small communication area, and is used to generate a vehicle interior area as well as a vehicle exterior area within a few meters from the vehicle that can be covered by the LF signal. The number of LF transmission antennas, which is four here, is not limited thereto and may be increased or decreased to suit the vehicle size or the layout of the antennas.

As in the third embodiment illustrated in FIG. 3, the stasis/movement determining circuit 12 can be used to control the two-way UHF communication circuit 17 based on determination about whether the portable communication device 1 is in a moving state (MCO) or a stationary state (SCO), and on determination about whether the portable communication device 1 is inside or outside the UHF communication range. The power consumption of the portable communication device 1 can accordingly be reduced.

The LF reception circuit 16 notifies the communication control device 11 that an LF band signal transmitted by the fixed communication device 2 has been received. The communication control device 11 receives the notification of LF band signal reception, determines that BLE communication is in a communication executable state (CPO), and activates reception operation of the two-way UHF communication circuit 17. In the case where a stationary state (SCO) is detected inside the vehicle, and interfering noise or the like leads to an erroneous determination that UHF communication is temporarily unavailable and to the suspension of the two-way UHF communication circuit 17, the portable communication device 1 is unable to connect to the fixed communication device 2 for a prolonged time and is locked inside the vehicle. Locking of the portable communication device 1 inside the vehicle can be prevented by configuring an LF signal area that covers the vehicle interior area, which is easy to accomplish, transmitting an LF signal from the fixed communication device 2, and re-activating the two-way UHF communication circuit 17 of the portable communication device 1.

Figure 5:
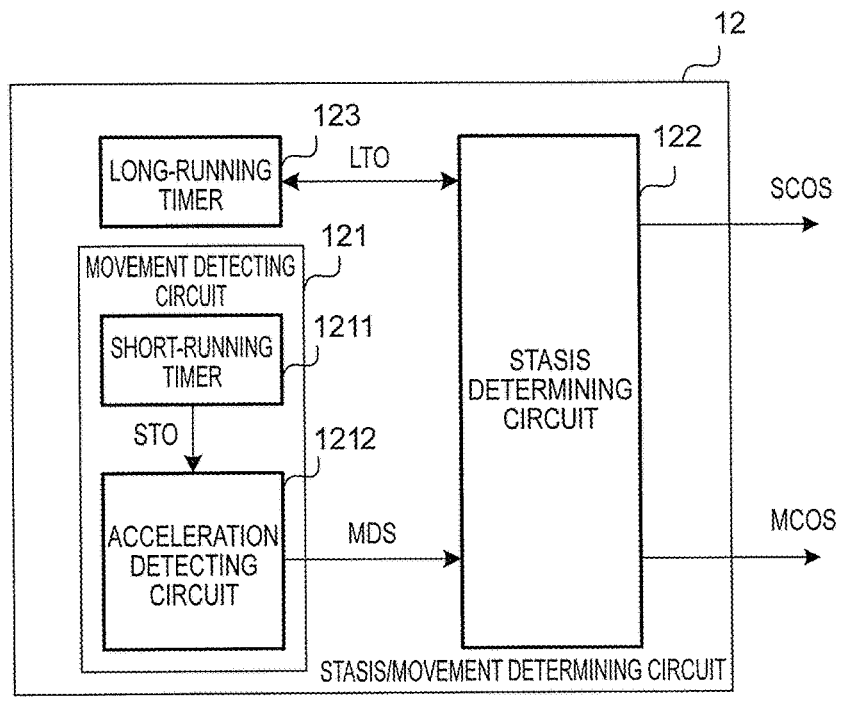
FIG. 5 is a block diagram for illustrating details of an example of how a stasis/movement determining circuit is configured according to the first embodiment to the fourth embodiment of the present invention.
Figure 8:
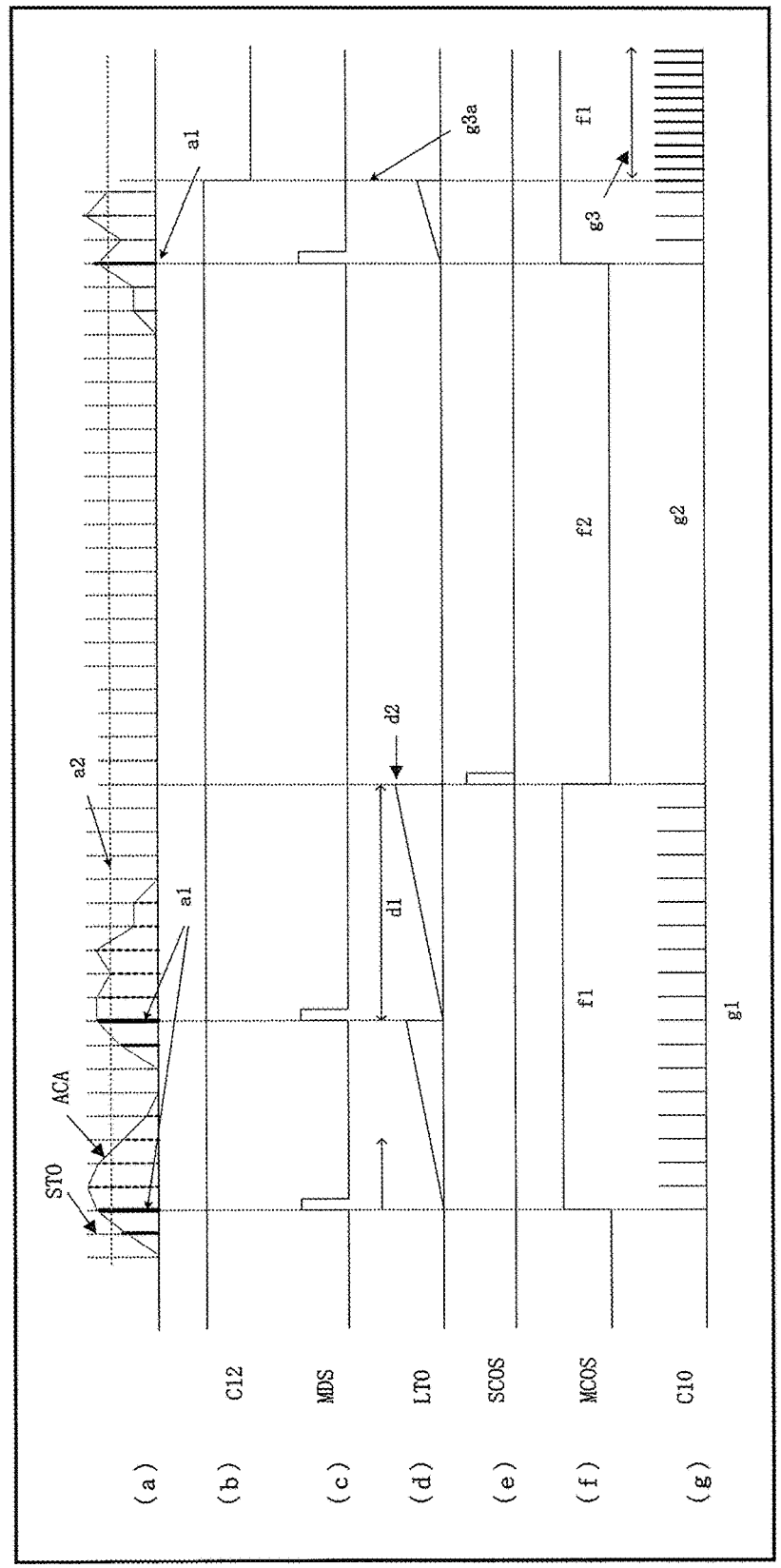
FIG. 8 is a timing chart for illustrating stasis/movement determination and what communication is held in the stasis/movement determining circuit of FIG. 5.

FIG. 5 is a diagram for illustrating an example of the configuration of the stasis/movement determining circuit 12 that is related to the embodiments of the present invention. FIG. 8 is a time chart in which the states of the system components are shown in order to illustrate the operation of the stasis/movement determining circuit 12 of FIG. 5 and what communication is held.

The stasis/movement determining circuit 12 in FIG. 5 includes a movement detecting circuit 121 configured to detect movement at preset regular time intervals, a stasis determining circuit 122 configured to output one of a stationary state detection signal (SCOS) and a moving state detection signal (MCOS) based on a movement detection signal (MDS) output by the movement detecting circuit 121, the stasis detection signal indicating a stationary state (SCO), the moving state detection signal indicating an in-motion state, which is a moving state (MCO), and a long-running timer 123 configured to generate a stasis determination period (d1) that is without movement.

Figure 6:
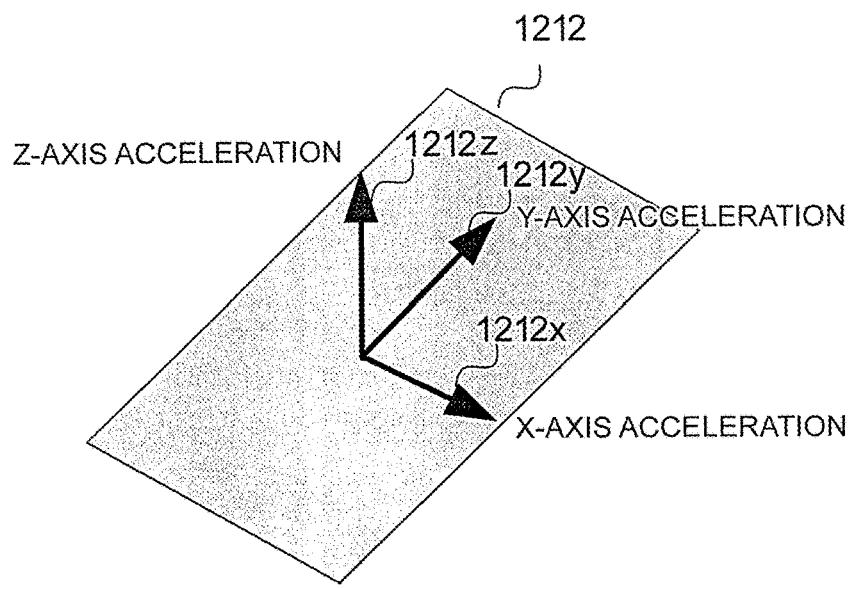
FIG. 6 is a diagram for illustrating an acceleration detecting circuit, which is a component of the stasis/movement determining circuit according to the first embodiment to the fourth embodiment of the present invention.

The movement detecting circuit 121 detects the amount of change in acceleration with the use of an acceleration detecting circuit 1212, at regular intervals generated by a short-running timer 1211. The acceleration detecting circuit 1212 includes a three-dimensional acceleration sensor (not shown) configured to measure three axis components that are orthogonal to one another as illustrated in FIG. 6: X-axis acceleration in the direction of an acceleration sensor X axis 1212x, Y-axis acceleration in the direction of an acceleration sensor Y axis 1212y, and Z-axis acceleration in the direction of an acceleration sensor Z axis 1212z. The acceleration detecting circuit 1212 is capable of detecting a change in acceleration in all directions. The acceleration changes when the portable communication device 1 shifts from a stationary state (SCO) to a moving state (MCO), or when the portable communication device 1 is in an in-motion state, which is a moving state (MCO).

In FIG. 8, (a) indicates short-running timer output STO of the short-running timer 1211 and a detected acceleration amount ACA, (b) indicates a control state c12 of the stasis/movement determining circuit 12, (c) indicates a movement detection signal MDS output by the acceleration detecting circuit 1212, (d) indicates long-running timer output LTO of the long-running timer 123, (e) indicates a stationary state detection signal SCOS output by the stasis determining circuit 122, (f) indicates a moving state detection signal MCOS output by the stasis determining circuit 122, and (g) indicates communication operation C10 of the BLE communication circuit 10.

As illustrated in FIG. 8, the acceleration detecting circuit 1212 samples the acceleration amount ACA by operation interrupt a1 at the time the short-running timer output STO generated by the short-running timer 1211 is output. At the time the acceleration amount ACA reaches a preset movement determination threshold a2 or higher, the acceleration detecting circuit 1212 determines that the portable communication device 1 has moved, and outputs the movement detection signal MDS. The long-running timer 123 is configured to count the length of time in which there is no movement, and measures the time elapsed since the movement of the portable communication device 1 is detected last. In the example of FIG. 8, the stasis determining circuit 122 resets the long-running timer 123 at the time the movement of the portable communication device 1 is detected. In the case where the long-running timer output LTO reaches a timer upper limit d2, which corresponds to a stasis determination period d1, without the long-running timer 123 being reset, the stasis determining circuit 122 determines that the portable communication device 1 is in a stationary state, and outputs the stationary state detection signal SCOS. The stasis determining circuit 122 outputs the moving state detection signal MCOS at the time the movement of the portable communication device 1 is detected.

The communication control device 11 determines a period in which the portable communication device 1 is in the moving state MCO and a period in which the portable communication device 1 is in the stationary state SCO, based on the moving state detection signal MCOS and the stationary state detection signal SCOS, respectively. In an in-motion period f1 in which the portable communication device 1 is in the moving state MCO, the communication control device 11 sets the BLE communication circuit 10 to an operation state indicated by g1. Specifically, the BLE communication circuit 10 enters an advertising state. When the period f1 shifts to a stationary period f2 in which the portable communication device 1 is in the stationary state SCO, and is not connected for BLE communication, the communication control device 11 suspends the BLE communication circuit 10 in a period g2. In the case where the portable communication device 1 is in the moving state MCO and connection for BLE communication is established as in a period g3 of (g) in FIG. 8, the communication control device 11 suspends the stasis/movement determining circuit 12 at first timing g3a in the period g3 as indicated by (b) of FIG. 8. Though not shown, the communication control device 11 activates the stasis/movement determining circuit 12 in the case where BLE communication is cut off while the stasis/movement determining circuit 12 is suspended.

Figure 7:
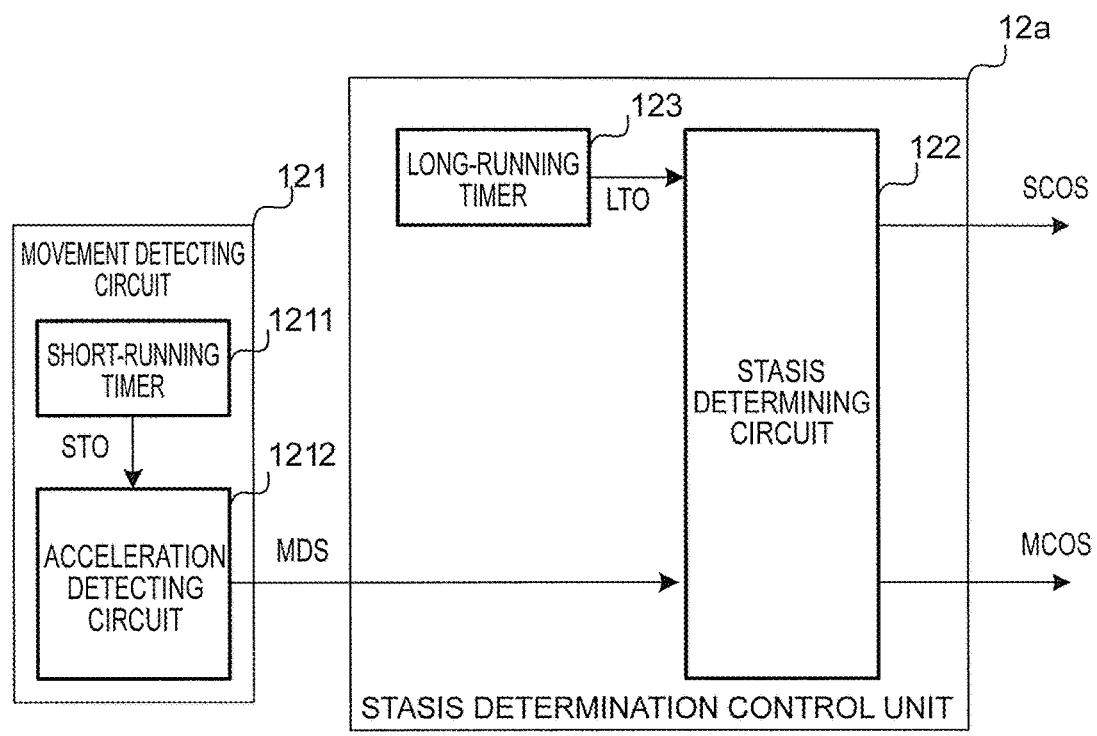
FIG. 7 is a block diagram for illustrating details of another example of how the stasis/movement determining circuit is configured according to the first embodiment to the fourth embodiment of the present invention.
Figure 9:
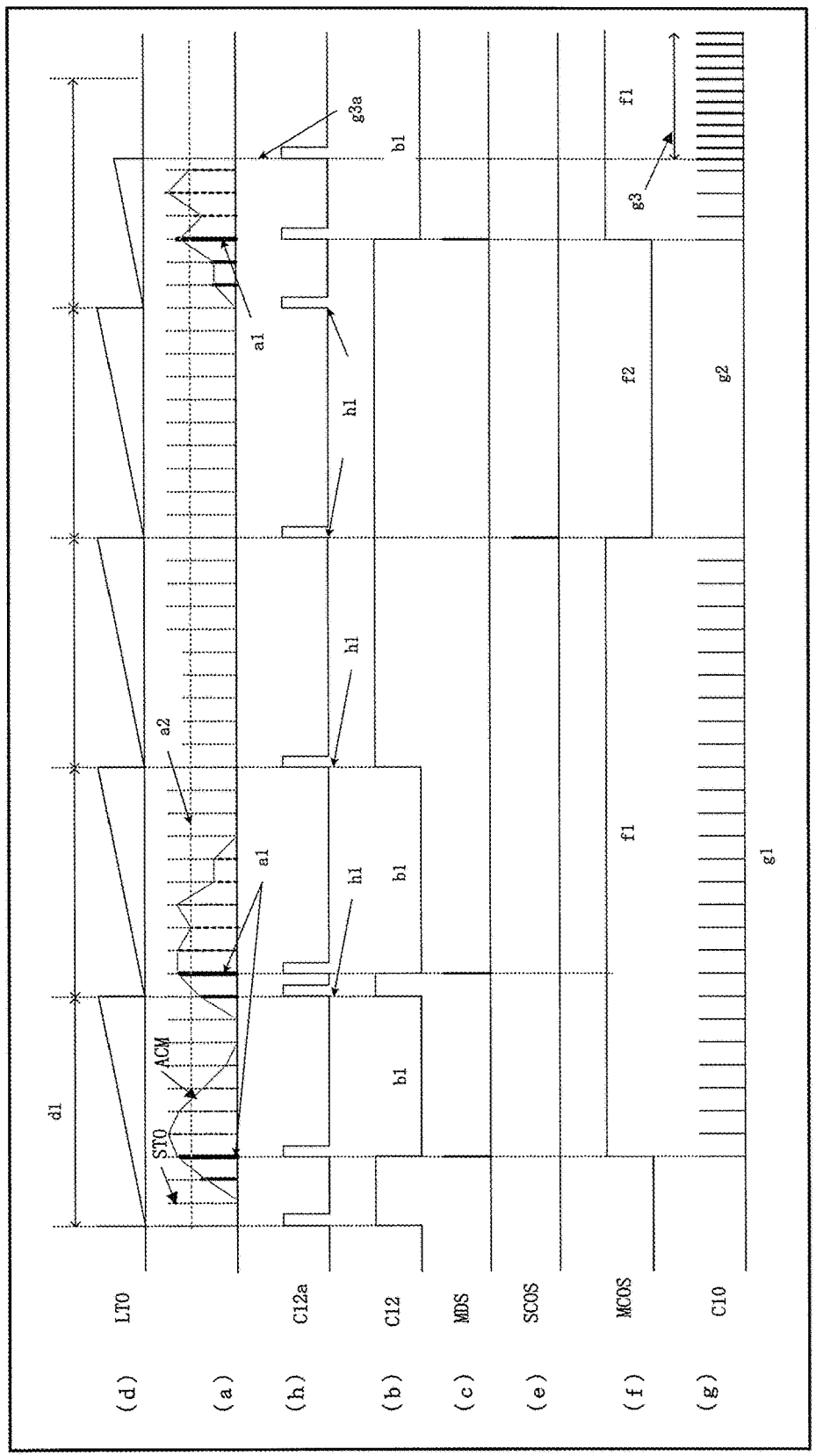
FIG. 9 is a timing chart for illustrating stasis/movement determination and what communication is held in the stasis/movement determining circuit of FIG. 7.

FIG. 7 is a diagram for illustrating another example of the configuration of the stasis/movement determining circuit 12 that is related to the embodiments of the present invention. FIG. 9 is a time chart in which the states of the system components are shown in order to illustrate the operation of the stasis/movement determining circuit 12 of FIG. 7 and what communication is held.

The stasis/movement determining circuit 12 in FIG. 7 includes a movement detecting circuit 121 configured to detect movement at preset regular time intervals, a stasis determining circuit 122 configured to output one of a stationary state detection signal (SCOS) and a moving state detection signal (MCOS) based on a movement detection signal (MDS) output by the movement detecting circuit 121, the stasis detection signal indicating a stationary state (SCO), the moving state detection signal indicating an in-motion state, which is a moving state (MCO), and a long-running timer 123 configured to generate a stasis determination period (d1) of (d) in FIG. 9 that is without movement.

The configuration of FIG. 7 differs from the configuration of the stasis/movement determining circuit 12 of FIG. 5 in that the stasis determining circuit 122 and the long-running timer 123 are processed by a separate processor illustrated as a stasis determination control unit (stasis determination control circuit) 12a in FIG. 7, and that this processor is incorporated in the communication control device 11.

FIG. 9 is obtained by adding a timing (h) to FIG. 8. At the timing (h), the communication control device 11 activates the stasis determination control unit 12a built from a microcomputer that includes the processor of FIG. 7 to perform state determination h1. The rest of FIG. 9 that are the same as or equivalent to the signals, the output, and the like in FIG. 8 are denoted by the same reference symbols that are used in FIG. 8.

The movement detecting circuit 121 detects the acceleration amount ACA, which is the amount of change in acceleration, with the use of the acceleration detecting circuit 1212 at regular intervals that are indicated by the short-running timer output STO generated by the short-running timer 1211. At the time the acceleration amount ACA reaches the preset movement determination threshold a2 or higher, the acceleration detecting circuit 1212 determines that there is movement, namely, that the portable communication device 1 has moved, and generates the movement detection signal MDS. The long-running timer 123 operates in a free running mode and, at the end of the stasis determination period d1, the stasis determining circuit 122 checks whether or not there has been movement during the stasis determination period d1. In the case where no movement of the portable communication device 1 is detected, the stasis determining circuit 122 generates the stationary state detection signal SCOS. The movement detection signal MDS is output at the time the acceleration detecting circuit 1212 detects movement.

The communication control device 11 determines an in-motion period in which the portable communication device 1 is in the moving state (MCO) and a stationary period in which the portable communication device 1 is in the stationary state (SCO) as indicated by (h), based on the moving state detection signal MCOS and the stationary state detection signal SCOS, which are sent from the stasis/movement determining circuit 12 and indicated by (f) and (e), respectively, in FIG. 9. The communication control device 11 sets the BLE communication circuit 10 to an operation state in the in-motion period as indicated by periods g1 and g3 of (g). Specifically, the BLE communication circuit 10 is in an advertising state. In the case where the portable communication device 1 is not connected for BLE communication when a shift to a stationary period takes place as indicated in a period f2 of (f), the communication control device 11 suspends the BLE communication circuit 10 in a period g2. In the case where connection for BLE communication is established as in the period g3 of (g) in FIG. 9, during the in-motion period in which the portable communication device 1 is in the moving state MCO, the communication control device 11 suspends the stasis/movement determining circuit 12 at first timing g3a in the period g3 as indicated by (b) of FIG. 9. Though not shown, the communication control device 11 activates the stasis/movement determining circuit 12 in the case where BLE communication is cut off while the stasis/movement determining circuit 12 is suspended. In the case where the movement of the portable communication device 1 is detected as indicated by the movement detection signal MDS of (c) during the stasis determination period dl of (d) in FIG. 9, the communication control device 11 suspends the stasis/movement determining circuit 12 till the end of the stasis determination period dl since the detection of movement, as in a period b1 of (b).

The timing waveforms illustrated in FIG. 8 and FIG. 9 are ones that are observed when the BLE communication circuit 10 is used as a two-way communication circuit. In the case where the UHF communication circuit 17 is used as a two-way communication circuit, the difference is that a connection check is performed, in other words, whether the portable communication device 1 is inside or outside a communication range is determined, at the time stasis/movement is detected, to suspend the UHF reception processing when it is determined that the portable communication device 1 is outside the communication range. Connection for communication is not maintained in the UHF communication circuit 17 unlike the BLE communication circuit 10 and, consequently, control for suspending the stasis/movement determining circuit 12 during the period of communication connection is not executed.

Figure 10:
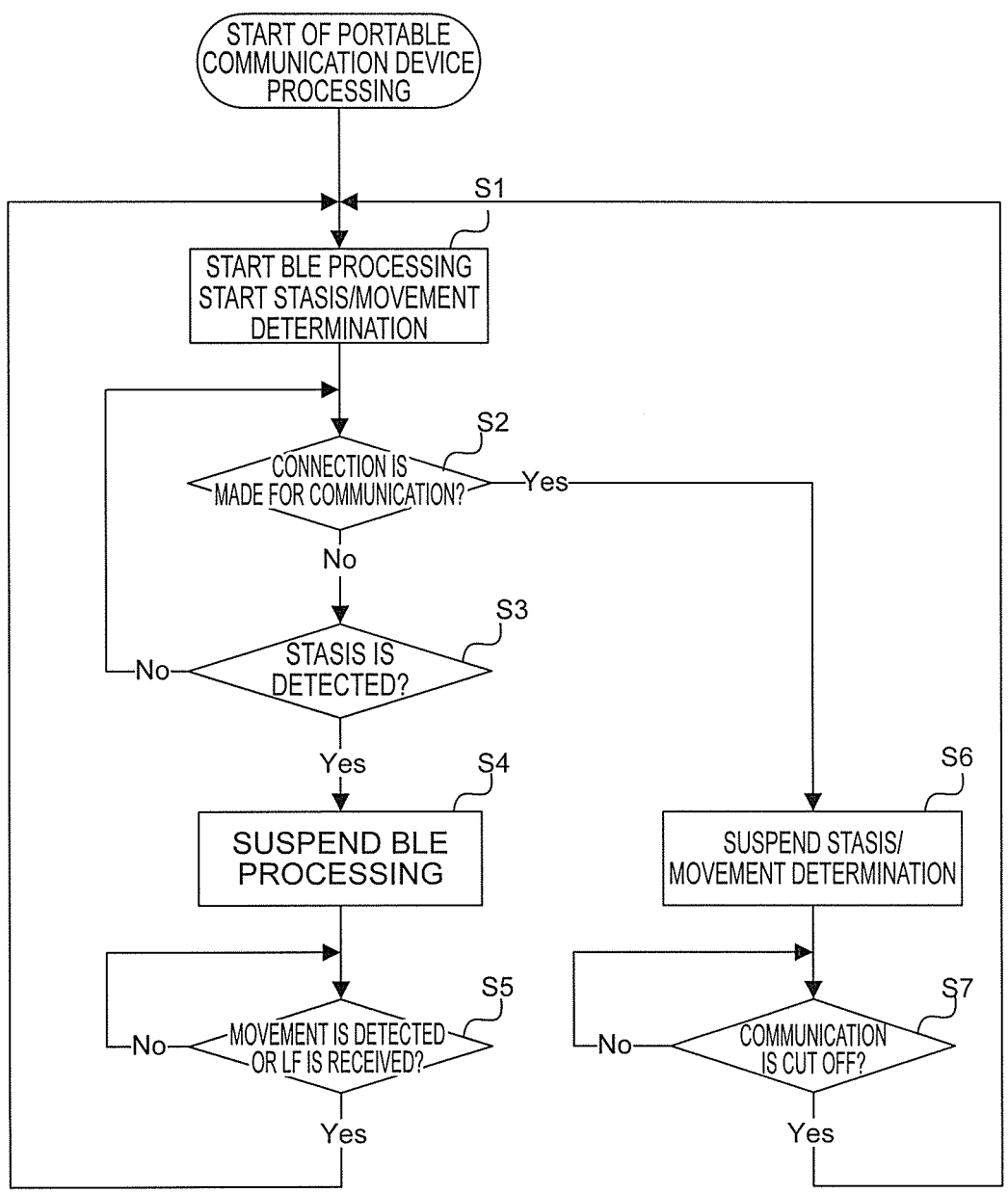
FIG. 10 is an example of a flow chart for illustrating control of a BLE communication circuit according to the first embodiment and the second embodiment of the present invention.

FIG. 10 is a flow chart of communication control that is exerted when the BLE communication circuit 10 is used as a two-way communication circuit. The control described below is executed mainly by the portable communication device-side communication control device 11. Processing of the portable communication device 1 is started and, in Step S1, processing of the BLE communication circuit 10 and processing of the stasis/movement determining circuit 12 are started. In the case where each processing is already active, the active processing is continued. The processing of the BLE communication circuit 10 involves checking the BLE communication state during BLE communication processing in Step S2. In the case where the portable communication device 1 is not connected for BLE connection, the communication control device 11 waits for the stasis/movement determining circuit 12 to detect in Step S3 a stationary period in which the portable communication device 1 does not move for a set length of time, in other words, the portable communication device 1 is in a stationary state (SCO). When there is no stationary state (SCO) to detect, the communication control device 11 returns to Step S2, where the BLE communication circuit 10 continues the communication connection check. In the case where a stationary state (SCO) is detected by the stasis/movement determining circuit 12, it means that the portable communication device 1 is stationary outside the communication range. In other words, it can be determined that the portable communication device 1 is unable to communicate unless the portable communication device 1 moves to a different place. The BLE communication circuit 10 is therefore suspended in Step S4 to reduce power consumption.

After that, in the case where an LF signal is received, the communication control device 11 returns to Step S1 to resume the BLE communication processing when the stasis/movement determining circuit 12 detects an in-motion state of the portable communication device 1 in Step S5 and the portable communication device 1 shifts to a moving state (MCO), or, in the case of the configurations in which the LF reception circuit 16 is installed.

In the case where the portable communication device 1 is connected for communication in Step S2, the communication connection is maintained irrespective of whether the portable communication device 1 is in a stationary state or an in-motion state, namely, whether the portable communication device 1 is in a moving state (MCO). To maintain the communication connection, power consumption is reduced by suspending the stasis/movement determining circuit 12 in the subsequent Step S6. The BLE communication circuit 10 detects the cutting off of BLE connection in Step S7, and the communication control device 11 returns to Step S1, where the stasis/movement determining circuit 12 is reactivated. Following this series of flow steps accomplishes prevention of unnecessary operation of the BLE communication circuit 10 and the stasis/movement determining circuit 12 based on the stationary/in-motion state of the portable communication device 1 and on the BLE communication state. An increase in power consumption is reduced as a result.

Figure 11:
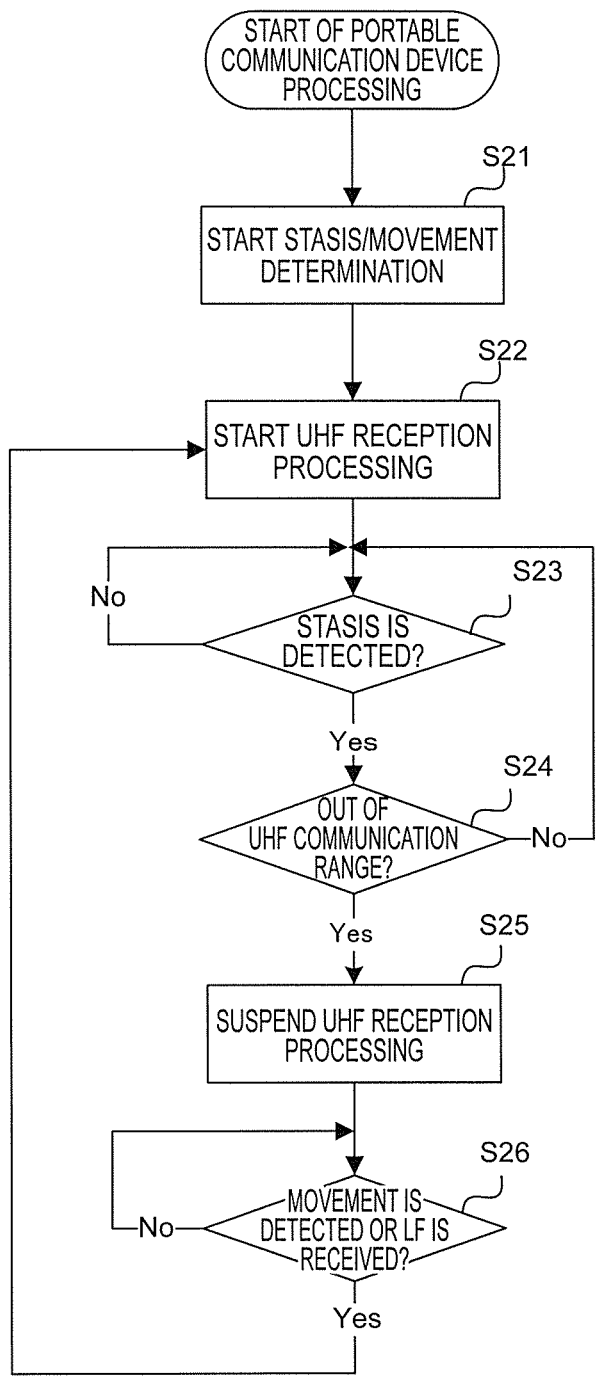
FIG. 11 is an example of a flow chart for illustrating control of a two-way UHF communication circuit according to the third embodiment and the fourth embodiment of the present invention.

FIG. 11 is a flow chart of communication control that is exerted when the UHF communication circuit 17 is used as a two-way communication circuit. The control described below is executed mainly by the portable communication device-side communication control device 11. Processing of the portable communication device 1 is started and, in Step S21, processing of the stasis/movement determining circuit 12 is started. In Step S22, the UHF communication circuit 17 starts reception processing. In the subsequent Step S23, the communication control device 11 waits for the stasis/movement determining circuit 12 to detect a state in which the portable communication device 1 does not move for a set length of time, namely, a stationary state (SCO). When the stationary state (SCO) is detected, the communication control device 11 checks in Step S24 whether or not the portable communication device 1 is outside the range of communication to and from the fixed communication device 2. Specifically, whether the portable communication device 1 is within the communication range is determined by transmitting a request signal from the UHF communication circuit 17 to the UHF communication circuit 25 of the fixed communication device 2, and checking if the UHF communication circuit 17 receives a response signal sent in response to the request signal. When the portable communication device 1 is within the UHF communication range, the communication control device 11 returns to Step S23, where the stasis/movement detection is continued. When the portable communication device 1 is outside the UHF communication range, on the other hand, the portable communication device 1 is in a stationary state outside the communication range, and it can be determined that the portable communication device 1 is unable to communicate without moving to a different place. The UHF communication circuit 17 is therefore suspended in Step S25 to reduce power consumption. After that, in the case where an LF signal is received, the communication control device 11 returns to Step S22 to resume the reception processing by the UHF communication circuit 17 when an in-motion state of the portable communication device 1 is detected in Step S26 and the portable communication device 1 shifts to a moving state (MCO), or, in the case of the configurations in which the LF reception circuit 16 is installed.

Control that activates and suspends a two-way communication circuit, which is relatively large in power consumption, without impairing convenience as described above can be effective control. In the portable communication device and communication system according to the present invention, the portable communication device 1 includes the stasis/movement determining circuit 12 and the second communication control device 11, which is a communication control device on the portable communication device 1 side. The stasis/movement determining circuit 12 is configured to convert a positional change of the portable communication device 1 into an electric signal, and to determine from the electric signal whether the portable communication device 1 is in a moving state in which the portable communication device 1 is in motion, or a stationary state in which the portable communication device 1 does not move for a set length of time. The second communication control device 11 is configured to perform control in which, when it is determined that the portable communication device 1 is in the stationary state and is outside the range of communication to and from the fixed communication device 2, the second communication circuit 10 or 17, which is a communication circuit on the portable communication device 1 side, is suspended and, when the moving state is detected while the second communication circuit 10 or 17 is suspended, the second communication circuit 10 or 17 is activated.

The stasis/movement determining circuit 12 and the second communication control device 11 execute processing of checking whether communication between the portable communication device 1 and the fixed communication device 2 is possible, at the time a user carrying the portable communication device 1 shifts from the moving state to the stationary state. The portable communication device 1 has as a communication destination the fixed communication device 2, which does not change its location, and whether or not communication can be established is accordingly translated into whether or not the portable communication device 1 is within the range of communication to and from the fixed communication device 2. In the case where communication to and from the fixed communication device 2 is not possible at the time the portable communication device 1 shifts to the stationary state, the state in which the communication is not possible, namely, a state in which the portable communication device 1 is located outside the range, lasts until the user carrying the portable communication device 1 moves. Suspension of the second communication circuit 10 or 17 accordingly does not cause a problem. The stasis/movement determining circuit 12 and the second communication control device are capable of detecting the vibration and movement of the portable communication device 1 that has been in the stationary state, and activate the second communication circuit 10 or 17 of the portable communication device 1 at the time of detection. This prepares the portable communication device 1 for entrance to the range of communication to and from the fixed communication device 2 as a result of the shift of the user carrying the portable communication device 1 to the moving state. There are many possible situations in daily life in which the user carrying the portable communication device 1 is outside the range of communication to and from the vehicle and leaves the portable communication device 1 in the stationary state. When the user is at home and when the user is working at the office are examples of the situations, and the stasis/movement determining circuit 12 enables the portable communication device 1 to prevent unnecessary power consumption in such situations.

In the portable communication device and communication system according to the present invention, the first communication circuit 20, which is a communication circuit of the fixed communication device 2 described above, and the second communication circuit 10 or 17 of the portable communication device 1 are communication circuits compliant with the communication standard of Bluetooth Low Energy. The operation of the stasis/movement determining circuit 12 is suspended in a communication executable state, in which the second communication circuit 10 or 17 and the first communication circuit 20 are connected to each other for communication. The stasis/movement determining circuit 12 is activated in a communication inexecutable state, in which the second communication circuit 10 or 17 and the first communication circuit 20 are not connected to each other for communication.

Figure 12:
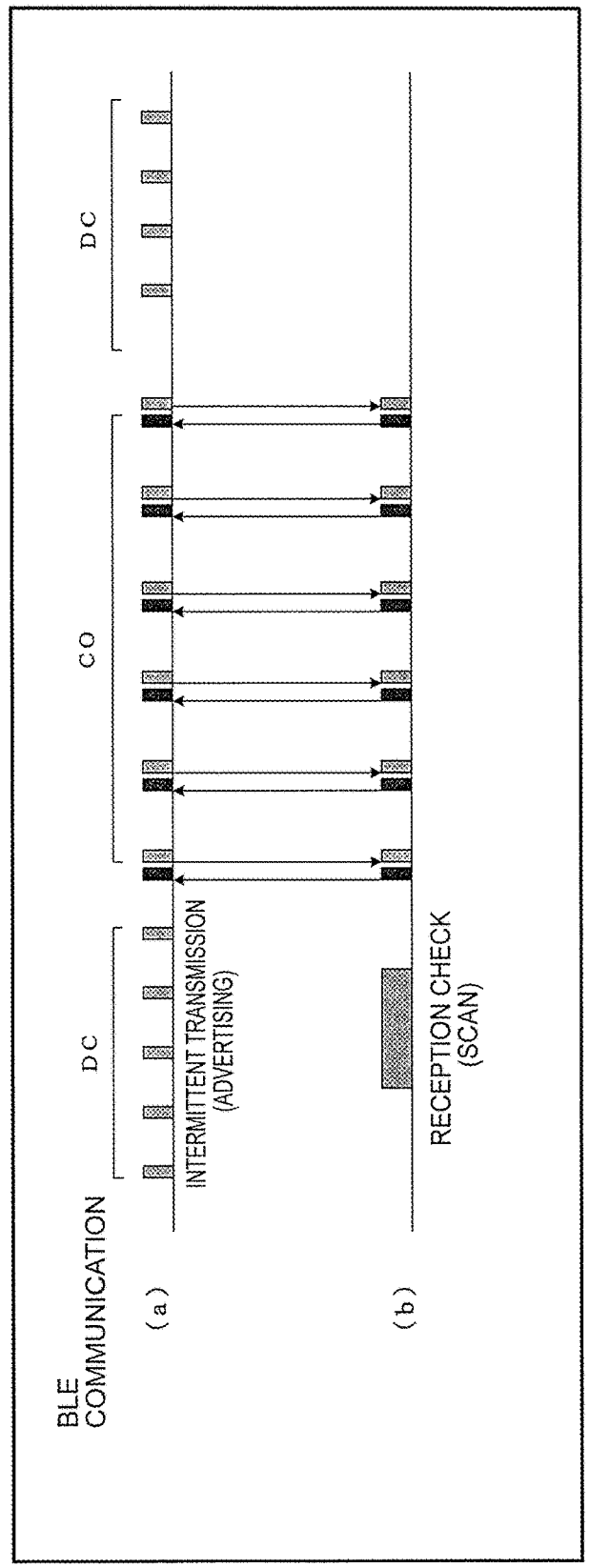
FIG. 12 is a timing chart for illustrating communication processing in communication between two BLE communication circuits according to the first embodiment and the second embodiment of the present invention.

One of the two communication devices compliant with the communication standard of Bluetooth Low Energy that is indicated by (a) (for example, the portable communication device 1) keeps intermittently transmitting (advertising) a short communication packet at regular intervals for communication connection, as illustrated in a communication waveform example of FIG. 12. The other of the two communication devices that is indicated by (b) (for example, the fixed communication device 2) scans the advertisement and receives the packet, at which point a connected state CO is established for synchronous communication from a disconnected state DC. The present invention may include communication processing designed so that the connected state CO changes to the disconnected state DC by disconnecting communication connection when a state in which communication cannot be held is detected during the synchronous connection, and shifts to an initial state.

With communication circuits of Bluetooth Low Energy used as the first communication circuit 20 and the second communication circuit 10 or 17, whether the second communication circuit 10 or 17 is inside or outside the range of communication can therefore be determined accurately from whether or not the first communication circuit 20 and the second communication circuit 10 or 17 are connected for communication. In the case where the first and second communication circuits are not connected for communication at the time the portable communication device 1 shifts to a stationary state, the second communication circuit 10 or 17 is suspended and then re-activated as soon as the portable communication device 1 shifts from a stationary state to a moving state. In the case where the first and second communication circuits are connected for communication, the communication connection needs to be maintained irrespective of whether the portable communication device 1 is in a stationary state or a moving state. In other words, stasis/movement determination does not need to be performed. The stasis/movement determining circuit 12 is accordingly controlled so as to be suspended when the first and second communication circuits are connected for communication, with the result that unnecessary power consumption of the stasis/movement determining circuit 12 itself is prevented as well. While the portable communication device 1 advertises and the fixed communication device 2 scans the advertisement in the example of FIG. 12, the same applies to the opposite case. Specifically, the portable communication device 1 in the opposite case controls the scan operation based on the result of stasis/movement determination to suppress an increase in power consumption.

In the portable communication device and communication system according to the present invention, the second communication circuit 10 or 17 of the portable communication device 1 described above is a communication circuit compliant with the communication standard of Bluetooth Low Energy, and can be connected for communication to one or both of the first communication circuit 20 of the fixed communication device 2 and the portable terminal 4, which includes the third communication circuit 40 compliant with the communication standard of Bluetooth Low Energy. When the second communication circuit 10 or 17 is connected for communication to at least one of the communication circuits, the operation of the stasis/movement determining circuit 12 is suspended. When the communication connection shifts to a state in which the second communication circuit 10 or 17 is connected to none of the connection circuits, the stasis/movement determining circuit 12 is activated.

An example of the portable terminal 4, which includes the third communication circuit 40, is a smartphone. When the communication system is designed so as to be connectable to a smartphone, the communication system can prevent, while aiming for higher sophistication, unnecessary power consumption of the second communication circuit 10 or 17 and the stasis/movement determining circuit 12 themselves by performing control in which the second communication circuit 10 or 17 is suspended when the second communication circuit 10 or 17 is in a stationary state and is not connected for communication, and the stasis/movement determining circuit 12 is suspended when the second communication circuit 10 or 17 is connected for communication.

In the portable communication device and communication system according to the present invention, the first communication circuit 20 or 25 of the fixed communication device 2 described above and the second communication circuit 10 or 17 of the portable communication device 1 described above are the two-way UHF communication circuits 17 and 25, which utilize a wireless signal in a UHF band. When the stasis/movement determining circuit 12 detects a stationary state and it is determined that the second communication circuit 17 and the first communication circuit 25 are outside a communication range and cannot hold communication, the operation of the second communication circuit 17 is suspended. The second communication circuit 17 is subsequently activated when a shift from a stationary state to a moving state is detected by the stasis/movement determining circuit 12.

Figure 13:
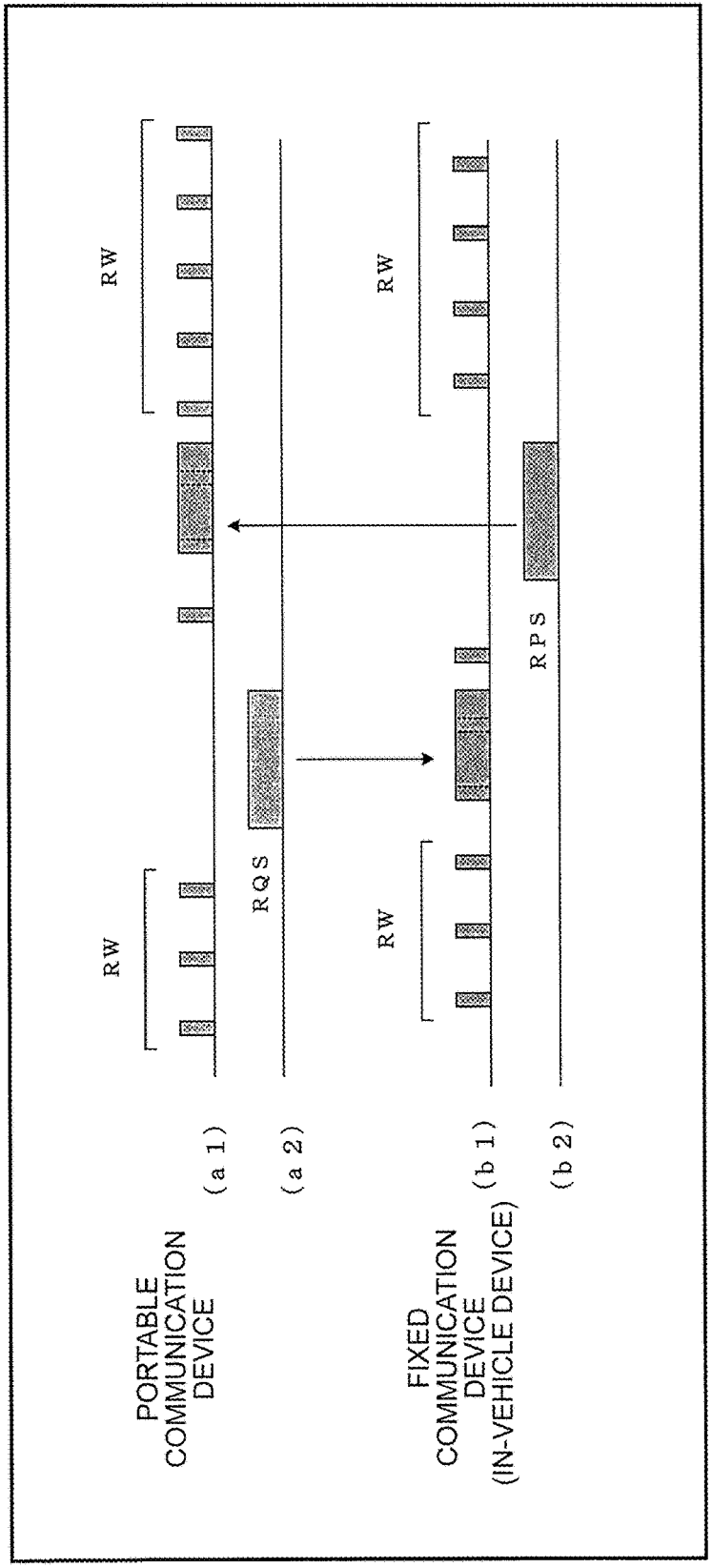
FIG. 13 is a timing chart for illustrating communication processing in communication between two two-way UHF communication circuits according to the third embodiment and the fourth embodiment of the present invention.

Two communication devices in two-way UHF communication need to wait for a UHF signal constantly in order to remain open to reception all the time. This is commonly accomplished by processing of checking for reception intermittently as indicated by a communication waveform example of FIG. 13, in view of power consumption. In FIGS. 13, (a1) and (a2) of the portable communication device represent UHF reception processing and UHF transmission processing, respectively, and (b1) and (b2) of the fixed communication device, which is an in-vehicle device, for example, represent UHF reception processing and UHF transmission processing, respectively. Reference symbols RW, RQS, and RPS represent a wait for reception, a request signal, and a response signal, respectively.

The sender-side communication device transmits a special signal detectable to the receiver-side communication circuit for a period longer than the cycle of the intermittent check, to ensure reception by the communication device at the other end of connection. Whether connection for communication is established can be checked by transmitting a check-use request signal RQS from one of the two communication devices to the other of the two communication devices, and receiving a response signal RPS that is sent by the other communication device in response to the received request signal RQS. While the portable communication device 1 transmits the request signal RQS and the fixed communication device 2 transmits the response signal RPS in the example of FIG. 13, the same applies to the opposite case. Whether or not the portable communication device 1 is within the communication range is determined by executing this communication connection check in the portable communication device 1 with respect to connection to the fixed communication device 2 at the time a stationary state is detected by the stasis/movement determining circuit 12. The reception processing of the second communication circuit 17 in the portable communication device 1 is suspended in the case where the portable communication device 1 is outside the range. The UHF signal reception processing is resumed at the time a moving state is detected by the stasis/movement determining circuit 12. Performing control in this manner suppresses an increase in power consumption that results from turning one-way UHF communication into two-way UHF communication.

The portable communication device and communication system according to the present invention may include the LF reception circuit 16 for an LF band in the portable communication device 1 described above, and the LF transmission circuit 23 in the fixed communication device 2 described above. Also in this configuration, as in the portable communication device and communication system described above, the stasis/movement determining circuit 12 and communication control device 11 of the portable communication device 1 detect a stationary state of the portable communication device 1 and suspend the second communication circuit 10 or 17 when it is determined that communication is not possible at the time of detection. The stasis/movement determining circuit 12 and the communication control device 11 re-activate the second communication circuit 10 or 17 in the case where the second communication circuit 10 or 17 is suspended at the time the portable communication device 1 shifts from a stationary state to a moving state.

Performing control in this manner cuts out unnecessary signal processing and reduces power consumption. The second communication circuit 10 or 17 is activated also when the LF reception circuit 16 of the portable communication device 1 receives an LF band signal from the LF transmission circuit 23 of the fixed communication device 2. A shift from a state in which the second communication circuit 10 or 17 is suspended to a communication executable state can be accomplished by changing the location of the portable communication device 1 that is in a stationary state. However, in the case where communication is temporarily cut off due to interfering noise or for other reasons and the stationary state is detected in the interior of a locked vehicle, the second communication circuit 10 or 17 is suspended, thereby locking the portable communication device 1 inside the vehicle. The portable communication device 1 in this state is unable to connect for communication to the fixed communication device 2 and to the portable terminal 4, for example, a smartphone, equipped with the third communication circuit 40. The second communication circuit 10 or 17 of the portable communication device 1 is re-activated by receiving an LF band signal, and this situation can thus be avoided.

In the portable communication device and communication system according to the present invention, the first communication circuit 20 or 25 of the fixed communication device 2 described above, and the second communication circuit 10 or 17 of the portable communication device 1 described above are communication circuits compliant with the communication standard of Bluetooth Low Energy. The operation of the stasis/movement determining circuit 12 is suspended in a communication executable state, in which the second communication circuit 10 and the first communication circuit 20 are connected to each other for communication. The stasis/movement determining circuit 12 is activated in a communication inexecutable state, in which the second communication circuit 10 and the first communication circuit 20 are not connected to each other for communication. In other words, the configuration of the communication system includes the LF reception circuit 16 in the portable communication device 1 and the LF transmission circuit 23 in the fixed communication device 2.

By using the Bluetooth Low Energy method in the two-way communication circuits, whether the portable communication device 1 is within a communication range or not can be determined accurately from whether or not the two-way communication circuits are connected for communication, as in the portable communication device and communication system described above. The stasis/movement determining circuit 12 is controlled so as to be suspended when the two-way communication circuits are connected for communication, because whether the user is in a stationary state or a moving state does not need to be determined while the connection for communication is made. When communication is cut off, on the other hand, the stasis/movement determining circuit 12 is activated so that the communication circuits can be suspended during the stationary state of the portable communication device 1. Performing control in this manner prevents unnecessary power consumption of the stasis/movement determining circuit 12 itself.

In the portable communication device and communication system according to the present invention, the first communication circuit 20 or 25 of the fixed communication device 2 described above and the second communication circuit 10 or 17 of the portable communication device 1 described above are communication circuits compliant with the communication standard of Bluetooth Low Energy, and the second communication circuit 10 of the portable communication device 1 can be connected for communication to one or both of the first communication circuit 20 of the fixed communication device 2 and the portable terminal 4, which includes the third communication circuit 40 compliant with the communication standard of Bluetooth Low Energy. When the second communication circuit 10 is connected for Bluetooth Low Energy communication to at least one of the communication circuits, the operation of the stasis/movement determining circuit 12 is suspended. When the communication connection shifts to a state in which the second communication circuit 10 or 17 is connected to none of the connection circuits, the stasis/movement determining circuit 12 is activated.

When the communication system is designed so as to be connectable to a smartphone, the communication system can prevent, while aiming for higher sophistication, unnecessary power consumption of the second communication circuit 10 and the stasis/movement determining circuit 12 themselves by performing control in which the second communication circuit 10 is suspended when the second communication circuit 10 is in a stationary state and is not connected for communication, and the stasis/movement determining circuit 12 is suspended when the second communication circuit 10 is connected for communication.

In the portable communication device and communication system according to the present invention, the first communication circuit 20 or 25 of the fixed communication device 2 described above and the second communication circuit 10 or 17 of the portable communication device 1 described above are the two-way UHF communication circuits 17 and 25, which utilize a wireless signal in a UHF band. When the stasis/movement determining circuit 12 detects a stationary state and it is determined that the second communication circuit 17 and the first communication circuit 25 are outside a communication range and cannot hold communication, the operation of the second communication circuit 17 is suspended. The second communication circuit 17 is subsequently activated when a shift from a stationary state to a moving state is detected by the stasis/movement determining circuit 12.

The portable communication device 1 checks UHF band communication to the fixed communication device 2 at the time a stationary state is detected by the stasis/movement determining circuit 12, to thereby determine whether or not the portable communication device 1 is within a communication range. The reception processing of the second communication circuit 17 in the portable communication device 1 is suspended in the case where the portable communication device 1 is outside the range. The UHF signal reception processing is resumed at the time an in-motion state is detected by the stasis/movement determining circuit 12. Performing control in this manner suppresses an increase in power consumption that results from turning one-way UHF communication into two-way UHF communication.

In the portable communication device and communication system according to the present invention, the stasis/movement determining circuit 12 is made up of the acceleration detecting circuit 1212, the long-running timer 123, and the stasis determination control unit configured to determine the stationary state and moving state of the portable communication device 1 from an electric signal output by the acceleration detecting circuit 1212 and an electric signal output by the long-running timer 123.

The acceleration detecting circuit 1212 keeps intermittently detecting acceleration amounts in three-axis directions orthogonal to one another. A signal corresponding to the amount of change in acceleration is generated through filtering processing that filters out gravitational acceleration, which is generated constantly. After this processing, the movement detection signal MDS is output in the case where each acceleration amount or the acceleration change amount ACA is equal to or more than a set value. Whether the portable communication device 1 has moved can be detected by observing the acceleration change amount ACA, which is generated by a tilt or change in position of the portable communication device 1 that accompanies the motion of the person carrying the portable communication device 1. The portable communication device 1 is determined as being in stasis from the lack of movement for a set length of time. For example, it is determined that the portable communication device 1 is in a stationary state when there is no movement for several seconds to several minutes.

Providing a stasis determination period prevents frequent switches between the stationary state and the in-motion state. The long-running timer 123 generates a stasis determination period signal. One of the stasis determining circuit 122 and the stasis determination control unit 12a determines stasis/movement from the movement detection signal MDS and the long-running timer output LTO, which is the stasis determination period signal. On the other hand, the portable communication device 1 is determined as being in a moving state as soon as the movement detection signal MDS is observed. In this manner, power consumption is reduced by suspending the second communication circuit 10 or 17 when a stationary state is detected, and excellent response is accomplished by immediately activating the second communication circuit 10 or 17 when an in-motion state is detected.

In the portable communication device and communication system according to the present invention, the portable communication device 1 is built from a smartphone or a similar cellular phone that additionally has functions of a computer.

The communication circuit 10 illustrated in FIG. 1 and FIG. 2 which is compliant with the communication standard of Bluetooth Low Energy, and the acceleration detecting circuit 1212 illustrated in FIG. 5 and FIG. 7 are included in a smartphone or a similar cellular phone that additionally has functions of a computer. The cellular phone can be used as the portable communication device 1, which is capable of holding communication to and from the fixed communication device 2, by installing the stasis determination control unit 12a illustrated in FIG. 7 in the cellular phone.

What is claimed is:
1. A portable communication device, comprising:
   a portable communication device-side two-way communication circuit configured to communicate data with a fixed communication device through two-way wireless communication;

a stasis and movement determining circuit configured to convert a change of position of the portable communication device into a respective electric signal, and to determine from the electric signal whether the portable communication device is in a moving state or a stationary state in which the portable communication device does not change the position for a set length of time; and a portable communication device-side communication control device configured to suspend operation of the portable communication device-side two-way communication circuit when the portable communication device is determined to be in the stationary state and communication with the fixed communication device is currently not executable, and configured to activate the portable communication device-side two-way communication circuit when a shift of the portable communication device to the moving state is detected while the operation of the portable communication device-side two-way communication circuit is suspended.

2. The portable communication device according to claim 1,
wherein the portable communication device-side two-way communication circuit comprises a first BLE communication circuit compliant with a communication standard of Bluetooth Low Energy, and
wherein the portable communication device-side communication control device is configured to:
suspend operation of the stasis and movement determining circuit in a communication executable state, which is a state in which the first BLE communication circuit is connected for communication to a second BLE communication circuit of the fixed communication device; and
activate the stasis and movement determining circuit in a communication not executable state, which is a state in which there is no connection for communication between the first BLE communication circuit and the second BLE communication circuit.

3. The portable communication device according to claim 1,
wherein the portable communication device-side two-way communication circuit comprises a first BLE communication circuit compliant with a communication standard of Bluetooth Low Energy, and
wherein the portable communication device-side communication control device is configured to:
suspend operation of the stasis and movement determining circuit when the first BLE communication circuit is currently capable of communicating with at least one of a second BLE communication circuit of the fixed communication device and a portable terminal-side two-way communication circuit of a portable terminal, wherein the portable terminal-side two-way communication circuit is compliant with the communication standard of Bluetooth Low Energy; and
activate the stasis and movement determining circuit when a shift to a communication not executable state occurs in which the first BLE communication circuit is not connected to the second BLE communication circuit and the portable terminal-side two-way communication circuit.

4. The portable communication device according to claim 1,
wherein the portable communication device-side two-way communication circuit comprises a two-way ultra-high frequency (UHF) communication circuit which communicates a wireless signal in a UHF band, and
wherein the portable communication device-side communication control device is configured to:
cause, when the stationary state is detected by the stasis and movement determining circuit, the two-way UHF communication circuit to transmit and receive a signal for checking a communication connection with a fixed communication device-side two-way UHF communication circuit, and to suspend the operation of the two-way UHF communication circuit when the two-way UHF communication circuit is outside a communication range with the fixed communication device-side two-way UHF communication circuit and is in a communication not executable state; and
activate the two-way UHF communication circuit when a shift from the stationary state to the moving state is detected by the stasis and movement determining circuit.

5. The portable communication device according to claim 1, wherein the portable communication device comprises a smart phone.

6. The portable communication device according to claim 2, wherein the portable communication device comprises a smart phone.

7. The portable communication device according to claim 1, wherein the stasis and movement determining circuit comprises:
an acceleration detecting circuit configured to output, as an electric signal, presence or absence of acceleration equal to or greater than a set value;
a long-running timer configured to output, as an electric signal, a movement detection period used to determine whether or not the portable communication device is in the stationary state; and
a stasis determining circuit configured to output a result of determining, from the electric signal output by the acceleration detecting circuit and the electric signal output by the long-running timer, whether the portable communication device is in the stationary state or the moving state.

8. The portable communication device according to claim 1,
wherein the fixed communication device is configured to control in-vehicle equipment, and
wherein the portable communication device and the fixed communication device are configured to wirelessly exchange control data about the in-vehicle equipment.

9. A portable communication device, comprising:
a portable communication device-side two-way communication circuit configured to communicate data wirelessly with a fixed communication device;
an LF reception circuit configured to process reception of an LF band signal that is transmitted by an LF transmission circuit of the fixed communication device;
a stasis and movement determining circuit configured to convert a change of position of the portable communication device into a respective electric signal, and to determine from the electric signal whether the portable communication device is in a moving state or a stationary state in which the portable communication device does not change the position for a set length of time; and
a portable communication device-side communication control device configured to:

suspend operation of the portable communication device-side two-way communication circuit when the portable communication device is determined to be in the stationary state and communication with the fixed communication device is currently not executable, and activate the portable communication device-side two-way communication circuit in response to at least one of:

a shift of the portable communication device to the moving state being detected while the portable communication device-side two-way communication circuit is suspended, and the LF reception circuit receives the LF band signal from the LF transmission circuit of the fixed communication device.

10. The portable communication device according to claim 9, wherein the portable communication device-side two-way communication circuit comprises a first BLE communication circuit compliant with a communication standard of Bluetooth Low Energy, and wherein the portable communication device-side communication control device is configured to:

suspend operation of the stasis and movement determining circuit in a communication executable state, which is a state in which the first BLE communication circuit is connected for communication to a second BLE communication circuit of the fixed communication device; and activate the stasis and movement determining circuit in a communication not executable state, which is a state in which no connection exists for communication between the first BLE communication circuit and the second BLE communication circuit.

11. The portable communication device according to claim 9, wherein the portable communication device-side two-way communication circuit comprises a first BLE communication circuit compliant with a communication standard of Bluetooth Low Energy, and wherein the portable communication device-side communication control device is configured to:

suspend operation of the stasis and movement determining circuit when the first BLE communication circuit is currently capable of communicating with at least one of a second BLE communication circuit of the fixed communication device and a portable terminal-side two-way communication circuit of a portable terminal, wherein the portable terminal-side two-way communication circuit is compliant with the communication standard of Bluetooth Low Energy; and activate the stasis and movement determining circuit when a shift to a communication not executable state occurs in which the first BLE communication circuit is not connected to the second BLE communication circuit and the portable terminal-side two-way communication circuit.

12. The portable communication device according to claim 9, wherein the portable communication device-side two-way communication circuit comprises a two-way ultra-high frequency (UHF) communication circuit which communicates a wireless signal in a UHF band, and wherein the portable communication device-side communication control device is configured to:

cause, when the stationary state is detected by the stasis and movement determining circuit, the two-way UHF communication circuit to transmit and receive a signal for checking a communication connection with a fixed communication device-side two-way UHF communication circuit, and to suspend the operation of the two-way UHF communication circuit when the two-way UHF communication circuit is outside a communication range with the fixed communication device-side two-way UHF communication circuit and is in a communication not executable state; and activate the two-way UHF communication circuit in response to at least one of:

where a shift from the stationary state to the moving state is detected by the stasis and movement determining circuit, and where the LF reception circuit receives the LF band signal from the LF transmission circuit of the fixed communication device.

13. The portable communication device according to claim 9, wherein the stasis and movement determining circuit comprises:

an acceleration detecting circuit configured to output, as an electric signal, presence or absence of acceleration equal to or greater than a set value;

a long-running timer configured to output, as an electric signal, a movement detection period used to determine whether or not the portable communication device is in the stationary state; and a stasis determining circuit configured to output a result of determining, from the electric signal output by the acceleration detecting circuit and the electric signal output by the long-running timer, whether the portable communication device is in the stationary state or the moving state.

14. The portable communication device according to claim 9, wherein the fixed communication device is configured to control in-vehicle equipment, and wherein the portable communication device and the fixed communication device are configured to wirelessly exchange control data about the in-vehicle equipment.

15. A communication system, comprising a combination of the portable communication device and the fixed communication device of claim 1.

16. A communication system, comprising a combination of the portable communication device and the fixed communication device of claim 9.

* * * * *